W. Gowen,
Cultivator.
No. 111,925. Patented Feb. 21, 1871.
Fig: 1.
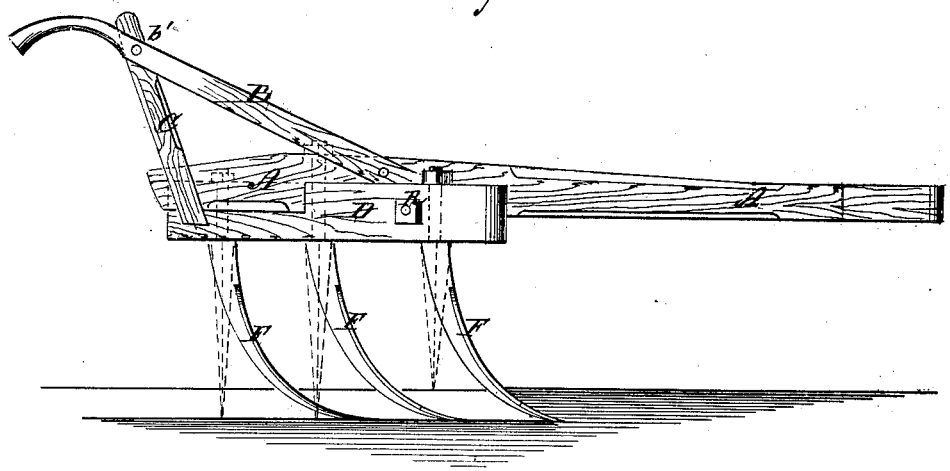
Fig: 2.
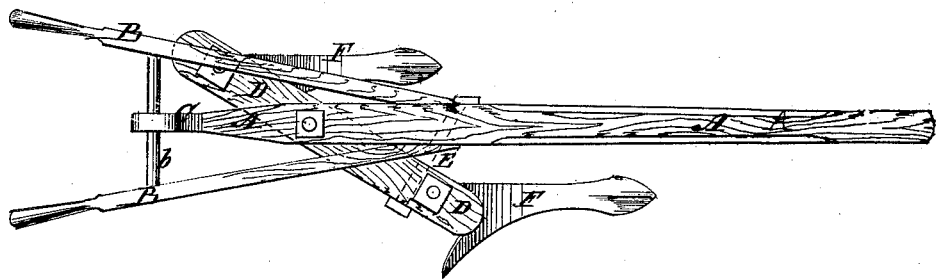
Witnesses:
C. Raettig
L. S. Mabee
Inventor:
W. Gowen
per Munn & Co.
Attorneys.

UNITED STATES PATENT OFFICE.

WILLIAM GOWEN, OF BARTLETT, TENNESSEE.

IMPROVEMENT IN CULTIVATOR-PLOWS.

Specification forming part of Letters Patent No. 111,925, dated February 21, 1871.

*To all whom it may concern:*

Be it known that I, WILLIAM GOWEN, of Bartlett, in the county of Shelby and State of Tennessee, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a side view of my improved cultivator. Fig. 2 is a top view of the same.

Similar letters of reference indicate corresponding parts.

This invention relates to an improved construction of plows, to be attached to a frame in such a manner as to form therewith a cultivator, designed for use in cultivating cotton, corn, and other growing crops.

The invention consists in the form of the plows, as shown in the drawings, and as specifically described and claimed hereinafter.

A is the plow-beam.

B are the handles, the forward ends of which are attached to the sides of the beam A.

C is a standard, the lower end of which is attached to the rear end of the beam A, and through the upper end of which passes the round b' of the handles B, so as to support the rear ends of said handles and hold them in their proper relative positions.

D is a cross-beam, which is framed into the under side of the rear part of the beam A at an angle with said beam of about fifty-three degrees, (53°,) as shown in Figs. 1 and 2. The connection between the beam A and cross-beam D is strengthened by the bolt E, that passes through the said beam A and through the forward part of the cross-beam D. F are the plows, which are made long, (about thirteen inches in length,) and with long narrow mold-boards and snake-head points, as shown in Figs. 1 and 2. This construction allows the plows to work deep or shallow in the ground, as may be desired, or as the circumstances of the case may require, and prevents the plows from running out of the ground when inclined to the side. The upper ends of the two end plows F pass up through the end parts of the cross-beam D, and are secured to said beam by nuts. The upper end of the central plow passes up through the cross-beam D and beam A, and is secured in place by a nut. By detaching the rear or left-hand plow, the machine is adjusted for plowing narrow rows. By detaching the plows F and replacing them by harrow-teeth, as shown in dotted lines in Fig. 1, the machine is adjusted for use as a harrow.

Having thus described my invention, what I claim as new and desire to secure by Letters Patent—

The plow F, having the snake-head point, narrow neck, and the long mold-board, gradually widening upward from said neck, as shown and described.

WM. GOWEN.

Witnesses:
    W. F. GOWEN,
    J. W. ALLEN,
    W. R. ECKLIN.